(12) United States Patent  
Susca et al.

(10) Patent No.: US 12,366,240 B2
(45) Date of Patent: Jul. 22, 2025

(54) PRESSURE CONTROLLED PUMP SYSTEMS

(71) Applicant: Hamilton Sundstrand Corporation, Charlotte, NC (US)

(72) Inventors: Ryan Prescott Susca, Windsor, CT (US); Naison E. Mastrocola, Goshen, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 117 days.

(21) Appl. No.: 18/202,675

(22) Filed: May 26, 2023

(65) Prior Publication Data

US 2024/0392791 A1 Nov. 28, 2024

(51) Int. Cl.
| | | |
|---|---|---|
| *F04B 49/22* | (2006.01) | |
| *F04B 23/08* | (2006.01) | |
| *F04B 49/08* | (2006.01) | |
| *F04D 1/00* | (2006.01) | |
| *F04D 13/06* | (2006.01) | |
| *F04D 15/00* | (2006.01) | |

(52) U.S. Cl.
CPC ............ *F04B 49/22* (2013.01); *F04B 23/08* (2013.01); *F04B 49/08* (2013.01); *F04D 1/00* (2013.01); *F04D 13/06* (2013.01); *F04D 15/0005* (2013.01)

(58) Field of Classification Search
CPC .......... F04B 49/22; F04B 23/08; F04B 49/08; F04B 23/10; F04B 23/14; F04B 49/12; F04D 13/06; F04D 1/00; F04D 15/0005
See application file for complete search history.

(56) References Cited

U.S. PATENT DOCUMENTS

| | | | |
|---|---|---|---|
| 5,118,258 A * | 6/1992 | Martin | F02C 7/236 |
| | | | 60/734 |
| 5,865,602 A | 2/1999 | Nozari | |
| 7,401,461 B2 | 7/2008 | Eick et al. | |
| 8,302,406 B2 * | 11/2012 | Baker | F02C 9/36 |
| | | | 60/734 |
| 8,434,301 B2 | 5/2013 | Fukui | |
| 11,060,461 B2 | 7/2021 | Turney et al. | |

(Continued)

FOREIGN PATENT DOCUMENTS

EP 0864699 B1 10/2004

OTHER PUBLICATIONS

Extended European Search Report dated Oct. 16, 2024, for corresponding European Patent Application No. 24177703.6, 9 pgs.

*Primary Examiner* — Bryan M Lettman
(74) *Attorney, Agent, or Firm* — Kinney & Lange, P.A.

(57) ABSTRACT

A controllable pump system can include an inlet line and a pressure controlled pump connected to the inlet line to receive input flow. The pressure controlled pump can have a pressure controlled pump state configured to control a pump output to an output line connected to the pressure controlled pump. The system can include a slew pump connected to the inlet line and configured to output a slew pump pressure, and a slew pressure valve connected to the input line and to a second line and configured to output a control pressure to the pressure controlled pump. The second line can be configured to be in fluid communication with at least the slew pump such that the slew pressure valve can receive the slew pump pressure.

18 Claims, 2 Drawing Sheets

(56) References Cited

U.S. PATENT DOCUMENTS

| | | | |
|---|---|---|---|
| 2010/0089026 A1* | 4/2010 | Baker | F02C 9/30 |
| | | | 137/565.29 |
| 2012/0234014 A1* | 9/2012 | Reuter | F02C 9/263 |
| | | | 60/773 |
| 2015/0167835 A1* | 6/2015 | Hwang | F04B 49/24 |
| | | | 137/565.14 |
| 2016/0201574 A1 | 7/2016 | Kelly et al. | |
| 2017/0089332 A1* | 3/2017 | Rill | F04C 2/084 |
| 2018/0340501 A1 | 11/2018 | Ni et al. | |
| 2019/0136851 A1* | 5/2019 | Sakai | E02F 9/2232 |
| 2019/0301445 A1* | 10/2019 | Sakai | F04B 49/20 |
| 2021/0102517 A1* | 4/2021 | Susca | F02C 7/26 |
| 2021/0270273 A1* | 9/2021 | Hayes | F04D 1/00 |
| 2023/0130997 A1 | 4/2023 | Rutar et al. | |

* cited by examiner

PRESSURE CONTROLLED PUMP SYSTEMS

FIELD

This disclosure relates to pressure controlled pump systems.

BACKGROUND

In traditional pressure controlled pump systems, when pump pressures are low, pump slew rates are also low, less than what is acceptable in many applications. Furthermore, smaller pump systems are desired, which can cause even lower slew rates at lower pressures.

Such conventional methods and systems have generally been considered satisfactory for their intended purpose. However, there is still a need in the art for improvements. The present disclosure provides a solution for this need.

SUMMARY

In accordance with at least one aspect of this disclosure, a controllable pump system can include an inlet line and a pressure controlled pump connected to the inlet line to receive input flow. The pressure controlled pump can have a pressure controlled pump state configured to control a pump output to an output line connected to the pressure controlled pump. The system can include a slew pump connected to the inlet line and configured to output a slew pump pressure, and a slew pressure valve connected to the input line and to a second line and configured to output a control pressure to the pressure controlled pump. The second line can be configured to be in fluid communication with at least the slew pump such that the slew pressure valve can receive the slew pump pressure.

The system can include a control line connected to the pressure controlled pump to be in fluid communication with the pressure controlled pump to allow control of the pressure controlled pump state. The slew pressure valve can be connected to the control line and configured to output the control pressure to the control line.

In certain embodiments, the slew pump can be driven by an electric motor. In certain embodiments, the slew pump can be a centrifugal pump.

In certain embodiments, the slew pressure valve can be an electro-hydraulic servo valve (EHSV) configured to output the control pressure to the pressure controlled pump. For example, the control line pressure can be between an input line pressure on the input line and the slew control pressure.

In certain embodiments, the system can include a control module configured to control the slew pressure valve to output the control pressure to cause a pressure controlled pump state to output a desired pump output from the pressure controlled pump. In certain embodiments, the system can include a pressure sensor downstream of the pressure controlled pump configured to provide a signal indicative of output pressure from the pressure controlled pump.

In certain embodiments, the second line can directly connect the slew pump to the slew pressure valve. In certain embodiments, the system can include a selector valve operatively connected between the slew pump and the slew pressure valve. The selector valve can also be connected to the output line to receive an output pressure from the output line. The selector valve can be configured to select between the slew pump pressure and the output pressure to supply to the second line and the slew pressure valve.

In certain embodiments, the selector valve can be configured to select the output pressure in an output line pressure state where the output pressure is higher than the slew pump pressure, and to select the slew pump pressure in a slew pump line state where the output pressure is lower than the slew pump pressure. The selector valve can be configured to send slew pump flow from the slew pump to the inlet line in the output line pressure state to cause the slew pump flow to circulate.

In accordance with at least one aspect of this disclosure, an aircraft fuel system can include a controllable pump system as disclosed herein, e.g., as described above. For example, the fluid used in the system can be fuel.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
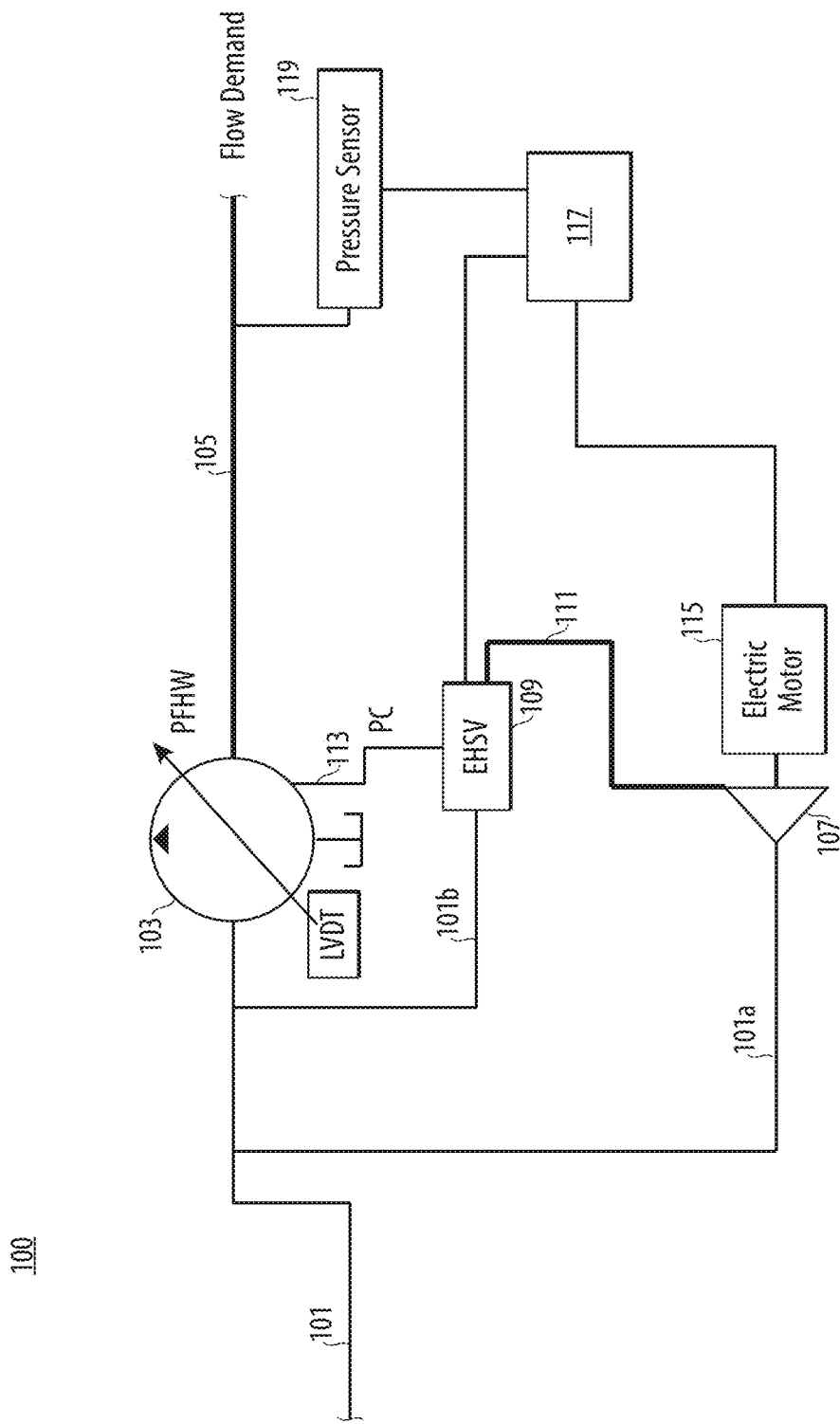
FIG. 1 is a schematic diagram of an embodiment of a system in accordance with this disclosure.
Figure 2:
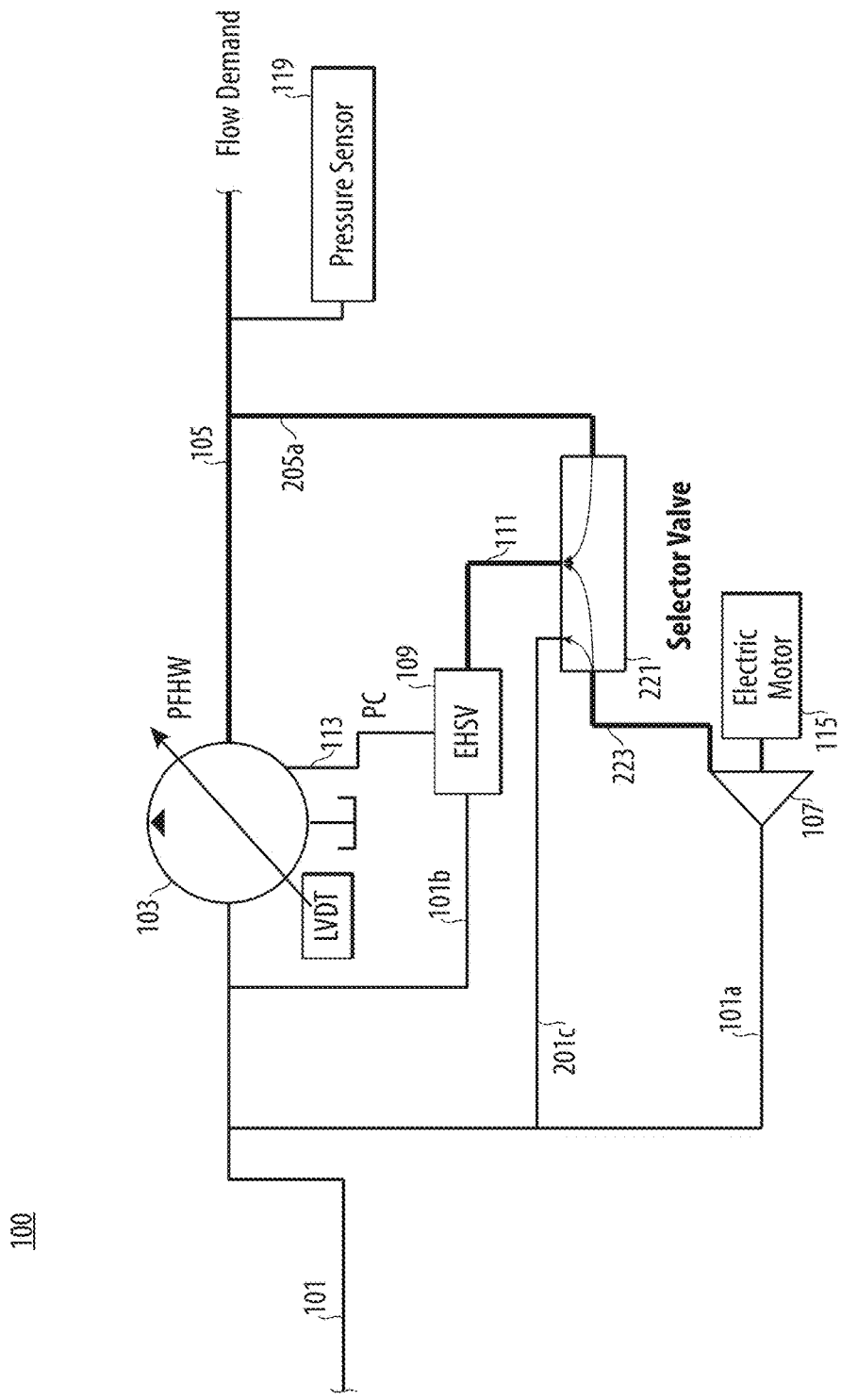
FIG. 2 is a schematic diagram of another embodiment of a system in accordance with this disclosure, shown having a selector valve in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments, views, and/or aspects of this disclosure are shown in FIG. 2.

Referring to FIG. 1, a controllable pump system 100 can include an inlet line 101 and a pressure controlled pump 103 connected to the inlet line 101 to receive input flow. The pressure controlled pump 103 can have a pressure controlled pump state (e.g., a hydraulically positioned element) configured to control a pump output to an output line 105 connected to the pressure controlled pump 103.

The system 100 can include a slew pump 107 connected to the inlet line 101 (e.g., via slew pump branch 101a) and configured to output a slew pump pressure. The system 100 can include a slew pressure valve 109 connected to the input line 101 (e.g., via valve branch 101b) and to a second line 111. The slew pump 107 can be configured to output a control pressure to the pressure controlled pump 103. The second line 111 can be configured to be in fluid communication with at least the slew pump 107 (e.g., directly as shown in FIG. 1, or indirectly as shown in FIG. 2) such that the slew pressure valve 109 can receive the slew pump pressure. (e.g., always as shown in FIG. 1, or selectively as shown in FIG. 2)

The system 100 can include a control line 113 connected to the pressure controlled pump 103 to be in fluid communication with the pressure controlled pump 103 to allow control of the pressure controlled pump state. The slew pressure valve 109 can be connected to the control line 113 and configured to output the control pressure to the control line 113.

In certain embodiments, the slew pump 107 can be driven by an electric motor 115. In certain embodiments, the slew pump 107 can be a centrifugal pump, e.g., as shown.

In certain embodiments, the slew pressure valve 109 can be an electro-hydraulic servo valve (EHSV) (e.g., as shown) which is configured to output the control pressure to the pressure controlled pump 103. For example, the control line pressure can be between an input line pressure on the input line and the slew control pressure.

In certain embodiments, the system can include a control module 117 configured to control the slew pressure valve 109 to output the control pressure to cause a pressure controlled pump state to output a desired pump output from the pressure controlled pump 103. In certain embodiments, the system can include a pressure sensor 119 downstream of the pressure controlled pump 103 configured to provide a signal indicative of output pressure on the output line from the pressure controlled pump 103.

In certain embodiments, the second line 111 can directly connect the slew pump 107 to the slew pressure valve as shown in FIG. 1. As shown in FIG. 2, in certain embodiments, the system 200 can include a selector valve 221 which can be operatively connected between the slew pump 107 and the slew pressure valve 109. The selector valve 221 can also be connected to the output line 105 (e.g., via selector branch 205*a*) to receive an output pressure from the output line 105. The selector valve 221 can be configured to select between the slew pump pressure (e.g., from a slew pump line 223) and the output pressure to supply to the second line 111 and the slew pressure valve 109.

In certain embodiments, the selector valve 221 can be configured to select the output pressure in an output line pressure state where the output pressure is higher than the slew pump pressure, and to select the slew pump pressure in a slew pump line state where the output pressure is lower than the slew pump pressure. The selector valve 221 can be configured to send slew pump flow from the slew pump 107 to the inlet line 101 (e.g., via a return branch 201*c*) in the output line pressure state to cause the slew pump flow to circulate.

In certain embodiments, the selector valve 221 can be a passive valve configured to mechanically select the source based on which pressure is higher. In certain embodiments, the selector valve 221 can be controlled by a controller (e.g., control module 117, not shown in FIG. 2 for clarity) to determine the state of the selector valve 221 (e.g., based on pressure readings from the pressure sensor 119). Any suitable control scheme for the selector valve 221 is contemplated herein. In certain embodiments, the control module 117 (e.g., a FADEC) can control the electric motor 115 to provide a desired pressure to the valve 109.

Certain embodiments of a pressure controlled pump 103 can include a pressure fluid hydraulic washed (PFHW) pump (e.g., an actuator pump). Any other suitable type of pump having a pressure controlled position is contemplated herein.

In accordance with at least one aspect of this disclosure, an aircraft fuel system can include a controllable pump system as disclosed herein, e.g., system 100, 200 as described above. For example, the fluid used in the system can be fuel.

Embodiments can allow control the slew rate of the pressure controlled pump without having to rely only on the output of the pressure controlled pump, e.g., using an electrically driven pump. Embodiments allow for a pump piston to be made very small and can utilize an electric motor sized to be enough to provide high pressure (e.g., 3000 psi) to make a desired slew rate (e.g., a low pressure controlled pump speeds).

Certain embodiments can allow selection of the pump slew source, e.g., whichever source pumping higher pressure. In certain embodiments, when below a threshold speed, for example, the electric motor can be controlled by a FADEC or other suitable control module to provide pressure, and a selector valve can close and only the electric motor driven slew pump can provide pressure.

Embodiments enable increasing variable displacement pump slew rate capabilities to enable lower system bandwidths for downstream system. With existing systems, when pump pressures are low, pump slew rates are also low, less than what is desired in certain applications.

Embodiments can include a variable displacement pump with direct pump displacement control via an EHSV, position feedback (e.g., via an LVDT), and a pressure sensor. A pump position can be set to maintain a pressure and flow schedule to support flow demands for a downstream system to minimize actuation pumping horsepower, for example. To minimize the pump actuator and actuation hydraulics size, the actuator muscle can be provided by either an electric pump or controlled via a selector valve (e.g., passive or active) that can select the greater of two pressures (e.g., variable displacement pressure controlled pump output or the electric pump output). Embodiments can provide higher pressures throughout the envelope to minimize actuator size compared to traditional methods where slew rate is tied to pump discharge pressure which is set by the downstream system.

Embodiments can reduce pump actuator/EHSV size, reduce fuel system inefficiency/thermal loads, and increases pump slew rate capabilities throughout the operational envelope. Embodiments can include any suitable computer hardware and/or software module(s) to perform any suitable function (e.g., as disclosed herein).

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A controllable pump system, comprising:
   an inlet line;
   a pressure controlled pump connected to the inlet line to receive an input flow, the pressure controlled pump having a hydraulically positioned element configured to control a pump output to an output line connected to the pressure controlled pump;
   a slew pump connected to the inlet line and configured to output a slew pump pressure, wherein an inlet of the slew pump is connected to the inlet line;
   a slew pump power source connected to the slew pump to drive the slew pump independent from the pressure controlled pump;
   and
   a slew pressure valve comprising:
      a valve inlet connected to an outlet of the slew pump by a second line;
      a first port connected to the inlet line by a valve branch; and
      a second port connected to the hydraulically positioned element of the pressure controlled pump by a control line.

2. The system of claim 1, wherein the slew pump power source comprises an electric motor.

3. The system of claim 1, wherein the slew pump is a centrifugal pump.

4. The system of claim 1, wherein the slew pressure valve is an electro-hydraulic servo valve (EHSV) configured to output the control pressure to the pressure controlled pump, the control line pressure being between an input line pressure on the input line and the slew control pressure.

5. The system of claim 1, further comprising a control module configured to control the slew pressure valve to output the control pressure to cause a pressure controlled pump state to output a desired pump output from the pressure controlled pump.

6. The system of claim 5, further comprising a pressure sensor downstream of the pressure controlled pump configured to provide a signal indicative of output pressure from the pressure controlled pump.

7. The system of claim 1, wherein the second line directly connects the slew pump to the slew pressure valve.

8. The system of claim 1, further comprising a selector valve operatively connected between the slew pump and the slew pressure valve, the selector valve also connected to the output line to receive an output pressure from the output line, wherein the selector valve is configured to select between the slew pump pressure and the output pressure to supply to the second line and the slew pressure valve.

9. The system of claim 8, wherein the selector valve is configured to select the output pressure in an output line pressure state where the output pressure is higher than the slew pump pressure, and to select the slew pump pressure in a slew pump line state where the output pressure is lower than the slew pump pressure.

10. The system of claim 9, wherein the selector valve is configured to send slew pump flow from the slew pump to the inlet line in the output line pressure state to cause the slew pump flow to circulate.

11. An aircraft fuel system, comprising:
    a controllable pump system, comprising:
       an inlet line;
       a pressure controlled pump connected to the inlet line to receive an input flow, the pressure controlled pump having a hydraulically positioned element configured to control a pump output to an output line connected to the pressure controlled pump;
       a slew pump connected to the inlet line and configured to output a slew pump pressure, wherein an inlet of the slew pump is connected to the inlet line;
       a slew pump power source connected to the slew pump to drive the slew pump independent from the pressure controlled pump;
       and
       a slew pressure valve comprising:
          a valve inlet connected to an outlet of the slew pump by a second line;
          a first port connected to the inlet line by a valve branch; and
          a second port connected to the hydraulically positioned element of the pressure controlled pump by a control line.

12. The system of claim 11, wherein the slew pump power source comprises an electric motor.

13. The system of claim 11, wherein the slew pump is a centrifugal pump.

14. The system of claim 11, wherein the slew pressure valve is an electro-hydraulic servo valve (EHSV) configured to output the control pressure to the pressure controlled pump, the control line pressure being between an input line pressure on the input line and the slew control pressure.

15. The system of claim 11, further comprising a control module configured to control the slew pressure valve to output the control pressure to cause a pressure controlled pump state to output a desired pump output from the pressure controlled pump.

16. The system of claim 15, further comprising a pressure sensor downstream of the pressure controlled pump configured to provide a signal indicative of output pressure from the pressure controlled pump.

17. The system of claim 11, wherein the second line directly connects the slew pump to the slew pressure valve.

18. The system of claim 11, further comprising a selector valve operatively connected between the slew pump and the slew pressure valve, the selector valve also connected to the output line to receive an output pressure from the output line, wherein the selector valve is configured to select between the slew pump pressure and the output pressure to supply to the second line and the slew pressure valve.

* * * * *